(12) United States Patent
Colombel et al.

(10) Patent No.: US 11,788,701 B2
(45) Date of Patent: Oct. 17, 2023

(54) LIGHTING DEVICE FOR A MOTOR VEHICLE

(71) Applicant: VALEO VISION, Bobigny (FR)

(72) Inventors: Jean-Marc Colombel, Angers (FR); Michel Hermitte, Angers (FR); Sylvain Giraud, Angers (FR)

(73) Assignee: VALEO VISION, Bobigny (FR)

( * ) Notice: Subject to any disclaimer, the term of this patent is extended or adjusted under 35 U.S.C. 154(b) by 94 days.

(21) Appl. No.: 17/627,605

(22) PCT Filed: Jul. 10, 2020

(86) PCT No.: PCT/EP2020/069469
§ 371 (c)(1),
(2) Date: Jan. 14, 2022

(87) PCT Pub. No.: WO2021/009018
PCT Pub. Date: Jan. 21, 2021

(65) Prior Publication Data
US 2022/0282845 A1 Sep. 8, 2022

(30) Foreign Application Priority Data
Jul. 15, 2019 (FR) ...................................... 1907912

(51) Int. Cl.
*F21S 41/19* (2018.01)
*F21S 41/27* (2018.01)
(Continued)

(52) U.S. Cl.
CPC ........... *F21S 41/192* (2018.01); *F21S 41/148* (2018.01); *F21S 41/27* (2018.01); *F21S 41/285* (2018.01); *F21S 41/321* (2018.01); *F21S 41/43* (2018.01)

(58) Field of Classification Search
CPC ........ F21S 41/192; F21S 41/27; F21S 41/148; F21S 41/321; F21S 41/43; F21S 41/285; F21S 41/657
See application file for complete search history.

(56) References Cited

U.S. PATENT DOCUMENTS

| 5,971,574 A | * | 10/1999 | Taniuchi | F21S 41/657 362/508 |
| 6,558,030 B2 | * | 5/2003 | Blusseau | F21S 41/657 362/372 |

(Continued)

FOREIGN PATENT DOCUMENTS

| EP | 3 299 700 A1 | 3/2018 |
| FR | 2 760 069 A1 | 8/1998 |

(Continued)

OTHER PUBLICATIONS

International Search Report dated Jul. 31, 2020 in PCT/EP2020/069469 filed on Jul. 10, 2020, 3 pages.

*Primary Examiner* — Matthew J. Peerce
(74) *Attorney, Agent, or Firm* — Oblon, McClelland, Maier & Neustadt, L.L.P.

(57) ABSTRACT

Lighting device, in particular for a motor vehicle, including at least two lighting modules and at least one support member supporting the lighting modules. Each lighting module includes at least one light source capable of emitting light rays and an optical system arranged, on a specific optical axis of the lighting module, across the light rays and configured to project a light beam. The support member supporting the different lighting modules is, on the one hand, rigidly connected to a closing element incorporating at least two optical systems and, on the other hand, connected to at least a first adjustment system enabling one of the lighting modules to move independently relative to at least the other lighting module.

19 Claims, 7 Drawing Sheets

(51) Int. Cl.
*F21S 41/148* (2018.01)
*F21S 41/32* (2018.01)
*F21S 41/43* (2018.01)
*F21S 41/20* (2018.01)

(56) References Cited

U.S. PATENT DOCUMENTS

| | | | |
|---|---|---|---|
| 6,953,274 B2 * | 10/2005 | Rice | B60Q 1/18 |
| | | | 362/800 |
| 2004/0202007 A1 | 10/2004 | Yagi et al. | |
| 2005/0018434 A1 * | 1/2005 | Giuliano | F21V 14/02 |
| | | | 362/372 |
| 2015/0204503 A1 | 7/2015 | Krenn et al. | |
| 2017/0120799 A1 | 5/2017 | Wasilewski et al. | |
| 2018/0087737 A1 | 3/2018 | Hermitte et al. | |
| 2018/0312103 A1 | 11/2018 | Helwig et al. | |

FOREIGN PATENT DOCUMENTS

| | | |
|---|---|---|
| FR | 2 853 717 A1 | 10/2004 |
| JP | 2009-283417 A | 12/2009 |

* cited by examiner

LIGHTING DEVICE FOR A MOTOR VEHICLE

The invention relates to the field of lighting and/or light-based signaling in the automotive field and, more particularly, to the systems for adjusting the position of lighting modules of a lighting device for a motor vehicle.

The field of lighting and/or of light-based signaling in motor vehicles is subject to regulations which dictate that each motor vehicle must be equipped with lights performing specific safety functions, and notably with high-beam and low-beam headlamps. Low-beam headlamps allow a motor vehicle to be seen by other road users and allow its driver to see the roadway ahead properly out to a distance of 30 meters, without dazzling other users in the roadway setting. High-beam headlamps emit more intense beams of light so that the driver of the motor vehicle can see the roadway properly out to a distance of 100 meters, under nighttime conditions.

It is known that the low-beam and high-beam headlamps are respectively created by a lighting module, and each lighting module may comprise an essentially point source of light, for example of the light-emitting diode type, and a collector, which comprises a reflective surface of revolution with an elliptical profile. The light source is therefore situated at a first focal point of the reflective surface and is oriented in such a way as to illuminate essentially in the direction of said surface. The rays of light are reflected in a convergent manner toward a second focal point of the reflective surface of the collector, which coincides with a focal point of an optical system of the lighting module, such as a lens, configured to project a beam of light reflected by the collector towards the roadway.

Within a motor vehicle, the lighting modules that create the low-beam and the high-beam headlamps may be grouped together into one same single lighting device positioned on the front face of a motor vehicle, notably to facilitate the creation of optical continuity when switching from low-beam to high-beam headlamps. When the lighting device is mounted on a motor vehicle, it is necessary to precisely adjust the orientation of each lighting module, on the one hand one independently of the other so as to ensure that the beam of light projected by each lighting module correctly illuminates the roadway in accordance with the regulations and, on the other hand, one with respect to the other so as to ensure that the transition from one beam intensity to the other is as smooth as possible. In order to achieve this it is known practice to resort to adjusting systems allowing control over the pivoting of the lighting module in various directions.

Such lighting devices nevertheless exhibit the disadvantage of comprising adjusting systems that are complex and bulky and which may prove tricky to adjust.

The invention falls within this context and proposes a lighting device, notably for a motor vehicle, comprising at least two lighting modules, and at least one support member supporting said lighting modules, each lighting module comprising at least one light source able to emit rays of light and an optical system positioned, on an optical axis specific to the lighting module, across the rays of light and configured to project a beam of light.

According to the invention, the support member bearing the various lighting modules is, on the one hand, secured to a closure element incorporating at least two optical systems and, on the other hand, connected to at least a first adjusting system allowing one of the lighting modules to be moved independently with respect to at least the other lighting module.

In other words, the present invention proposes a lighting device exhibiting a compact architecture notably since it comprises an optical system such as a thin projection lens, where appropriate without any protective outer lens, this compact architecture allowing an adjusting system for independently adjusting the position of one lighting module with respect to the other to be incorporated into the device at the support member.

What should be understood by "lighting module" is a lighting unit comprising at least the light source and the optical system arranged in the path of the rays emitted by the light source. Such a lighting module may comprise a collector, in the direction of which the light source emits its rays. The collector is notably equipped with a reflective surface configured to deflect the rays of light emitted by the light source in the direction of the optical system.

In the present invention, the collector has an elliptical or parabolic shape, an elliptical collector advantageously making it possible to reduce the height of the optical system consisting, for example, of a thin projection lens, formed in its path.

According to one feature of the invention, the optical system is configured to project an image of the reflective surface of the collector. In other words, the image projected onto the roadway setting by the lighting device is direct imaging of the collector and the shape of the latter has an influence on the image projected onto the roadway setting. In this context, the collector may be configured so that it has an end edge in the vicinity of the light source with a specific profile which contributes to giving the projected image an appropriate profile, and notably an appropriate cut-off, for performing a desired optical function.

The end edge of the collector in the vicinity of the light source may notably be cut off in such a way as to exhibit a staircase profile, the particular shape of this edge contributing to forming a staircase cut-off in the beam of light that the collector contributes to generating by deflecting the rays emitted by the source through the optical system.

The light source may be of the semiconductor type and may consist of at least one light-emitting diode (LED) formed at a first focal point of the collector of the module.

As has been specified, the lighting device comprises a closure element incorporating several optical systems and a support member secured to this closure element.

More particularly, the closure element is at least partially transparent and is configured to incorporate the optical systems of at least two lighting modules of the lighting device. What is meant by incorporating the optical systems is just as much a configuration whereby the closure element incorporates the optical systems, namely is produced as one piece with the optical systems, as a configuration whereby the closure element bears the optical systems, which is to say that the optical systems are attached to the closure element. The closure element and the optical systems may thus be produced from identical materials, for example polymethyl methacrylate (PMMA) or polycarbonate (PC), or the closure element may be analogous to a protective window and be made from a neutral material such as glass or synthetic polymers such as polycarbonate PC or polyetherimide PEI, so as to support optical systems that may be made from polymethyl methacrylate (PMMA).

The support member may have the form of a plate, a mounting plate or a housing open on at least one side, and this support member, secured to the closure element, is configured to support the various lighting modules. The support member and the closure element thus delimit, in a substantially fluidtight manner, a first volume in which the lighting modules extend.

Each optical system consists of a projection lens and, more specifically in the case of a compact lighting device, of a thin projection lens, having a thickness that may be less than 7 mm and, for example, of the order of 6 mm. In order to reduce the bulkiness of the lighting device, the optical system of the present invention is particularly positioned near the light source and, where applicable, near the collector of the corresponding module. By way of example, when the collector is of elliptical shape, the optical system may be interposed between the first focal point and the second focal point of said collector.

In this context of a low-bulk lighting device with an optical system arranged as close as possible to the light source and, notably, interposed between the two focal points of the collector, the inventors have been able to observe that the modules can be adjusted independently with respect to one another through translational movement.

According to one feature of the invention, and in order specifically to orientate the beam of light of the lighting module so that it passes through the corresponding optical system, the position of at least the lighting module may be adjusted by a first adjusting system the particular feature of which is that it generates translational movement with a single directional component perpendicular to the optical axis of the lighting module. More specifically, the first adjusting system for at least one of the lighting modules comprises translational-guidance means guiding the lighting module in a translational movement with respect to the support member along an axis perpendicular to the corresponding optical axis.

The lighting module is thus moved with respect to the closure element but also with respect to the support member and at least the other lighting module in a translational movement along an axis perpendicular to the optical axis.

According to one feature of the invention, each lighting module is mounted on the support member via a first adjusting system comprising translational-guidance means guiding the lighting module with respect to the support member, the lighting device being configured so that the translational-guidance means are oriented in different directions. What is meant by oriented in a determined direction is that the translational-guidance means are configured so that the corresponding lighting module moves unidirectionally in this determined direction. In other words, each lighting module is equipped with a first translational-adjustment system, capable of allowing it to move with respect to the optical system specific to it with respect to the support member and with respect to the other lighting module, and a first lighting module is capable of being moved in a first direction perpendicular to the optical axis, for example a transverse direction, whereas a second lighting module is capable of being moved in a second direction perpendicular to the optical axis, for example a vertical direction.

According to one feature of the invention, each first adjusting system comprises, in addition to the translational-guidance means guiding the lighting module with respect to the support member, on the one hand, position-stop means and adjusting means for adjusting the translational movement of the lighting module.

According to one feature of the invention, the position-stop means and the adjusting means comprise at least one oblong element and a circular element which are formed respectively on one or the other of the lighting module and the support member and positioned facing one another, the oblong element of the position-stop means extending in a direction substantially perpendicular to the direction in which the oblong element of the adjusting means extends.

The translational-guidance means of the first adjusting system may consist of a guideway system, the guideways being formed for example by collaboration between rails arranged on the support member and guide lugs secured to the corresponding lighting module, said guideways of the first adjusting system, which are parallel to one another, extending in a direction substantially perpendicular to the optical axis and parallel to the direction in which the position-stop means chiefly extend.

According to one feature of the invention, the first adjusting system(s) are configured so that the translational-guidance means are inside a first volume defined by the support member and the closure element, and so that the position-stop means and the adjusting means respectively comprise a binding screw or a tool passing through a base of the support member. In that way, the adjusting and binding means are easily operated from outside the closed housing formed by the support member and the closure element, it being possible for the lighting modules to slide freely inside this housing via the guide means internal to the housing.

The lighting modules which are adjustable independently of one another are easier to seal since only the sealing in the regions where elements penetrate the base requires attention. Sealing elements may be provided around these penetrations, these sealing elements advantageously being compressed when the lighting module is stopped in its position with respect to the support member via operation of the binding screw.

A part of the guidance, adjusting or position-stop means is formed on a body of the lighting module, which body may notably consist of a heatsink intended to cool the light source and the collector that it bears.

Said body is particularly configured to collaborate with at least the first adjusting system so that when the first adjusting system is moved, the body of the lighting module is moved with it and the position of the collector and of the light source with respect to the optical system of the corresponding lighting module is modified.

According to one feature of the invention, the position of the support member is adjusted by a second adjusting system, said second adjusting system being configured to simultaneously adjust the position of the various lighting modules. Thus it is advantageously possible, because of this stepwise adjustment with, on the one hand, independent adjustment of the lighting modules within the housing formed by the support element and the cover element and, on the other hand, simultaneous adjustment of these lighting modules by moving the housing in its entirety, to achieve optimal adjustment in several adjusting sequences in different places. In particular, it is possible at a first factory to adjust the position of the lighting modules with respect to a frame of reference formed by the support member and then to adjust the position of the whole when mounting the lighting device on the vehicle. This is notably advantageous insofar as accessibility to the adjusting means during the mounting on the vehicle may be rendered difficult by the presence of other components in that part of the vehicle in which the lighting device is mounted.

According to one feature of the invention, the second adjusting system is configured to move the support member in a rotational movement about a first axis of pivoting or about a second axis of pivoting, the first axis of pivoting and the second axis of pivoting being substantially perpendicular to at least the optical axis and substantially perpendicular to one another.

Such an adjusting system may for example be implemented by a three-point system comprising one fixed point and two articulations, each of said articulations being configured to drive the rotation of the support member about one of the axes of pivoting. Actuation of the second adjusting system thus leads to a change in the position of the support member and therefore of the two lighting modules and of the closure element. In other words, the second adjusting system does not alter the position of the lighting modules with respect to their respective optical systems or with respect to the closure element but allows a second adjustment that simultaneously alters the position of the various lighting modules.

According to a first embodiment, at least the closure element comprises side walls for fixing to the support member and a thin projection lens which is common to at least two lighting modules and which incorporates at least the optical systems of said lighting modules, the thin projection lens formed in the closure element and the optical systems being made from the one same material.

In other words, the optical systems consist of defined portions of the closure element exhibiting, for example, a convex face extending in the direction of the body of the corresponding lighting module.

According to one feature of the invention, the lighting device may also comprise an external housing open on at least one side and closed by an optically neutral protective window, the external housing and the protective window delimiting a main chamber in which there extend the support member, the various lighting modules and at least the closure element incorporating at least two optical systems. What is meant by optically neutral is that the rays passing through the material concerned are deflected little if at all.

The external housing and the protective window thus form a fluidtight space configured to protect the lighting modules from the environment external to the vehicle. In particular, the external housing and the protective window form a second protective barrier for the lighting modules, in addition to the one formed by the closure element. Also, the external housing and the protective window protect the second adjusting system from the external environment, thus preventing a buildup of particles in the articulations of which it is made.

According to one feature of the first embodiment, the second adjusting system extends, at least in part, between the support member and a base of the external housing. The second adjusting system thus allows the position of the two lighting modules and of the closure element, which are borne by the support member, to be adjusted simultaneously with respect to the external housing.

According to one feature of the invention, said external housing is attached to a structure of the motor vehicle by at least one fixing member.

Such a fixing member is discernible from the first adjusting system and second adjusting system in that it is not articulated and does not allow the position of the lighting device with respect to the structure of the motor vehicle to be altered. The fixing member may notably consist of a screw.

According to alternative embodiments, the support member takes the form of an open housing equipped with opaque side walls and covered by a protective window, the protective window being made of a transparent and optically neutral first material, and the protective window comprising at least the optical systems of at least two distinct lighting modules, the optical systems consisting of thin projection lenses made from a second material which may be distinct from the first material of the protective window.

The optical systems, such as lenses made up of polymethyl methacrylate (PMMA) or of polycarbonate (PC) for example, are thus configured to project the beams of light reflected by the collector onto the roadway whereas the closure element, for example made of glass or of a synthetic polymer, does not alter the path of any beams of light that pass through it.

Advantageously, the side walls at least partially absorb external rays of light, for example those emitted by the sun or any artificial light source external to the motor vehicle, that are liable to enter the first volume.

According to alternative embodiments of the present invention, the second adjusting system may be fixed to the structure of the motor vehicle and extend between said structure and the support member.

Alternatively, the second adjusting system may be fixed to an intermediate mounting plate and extends between said intermediate mounting plate and the support member, the intermediate mounting plate being attached to a structure of the motor vehicle by at least one fixing member.

The present invention also proposes a motor vehicle comprising at least one lighting device as described hereinabove formed on the front face and/or on the rear face of the motor vehicle.

Further features, details and advantages of the invention will become more clearly apparent from reading the following description, and also from a number of exemplary embodiments given by way of nonlimiting indication, with reference to the appended schematic drawings, in which.

It should first of all be noted that although the figures set out the invention in detail for its implementation, said figures may, of course, be used in order better to define the invention if necessary.

By convention, throughout the present document, the qualifier "longitudinal" applies to the direction in which the optical axis of at least one of the lighting modules extends, the qualifiers "transverse" and "vertical" relating respectively to directions substantially perpendicular to the longitudinal direction and perpendicular to one another and corresponding to the main dimensions in which a base of the support member extends. Further, a longitudinal direction will be indicated, in the figures that require it, by the axis Ox, a vertical direction will be indicated by the axis Oy, and a transverse direction will be indicated by the axis Oz. These various axes together define an orthonormal frame of reference Oxyz indicated in the various figures. Within this frame of reference, the qualifiers "top" or "upper" will be indicated by the positive direction of the axis Oy, the qualifiers "bottom" or "lower" being indicated by the negative direction of this same axis Oy.

Figure 1:
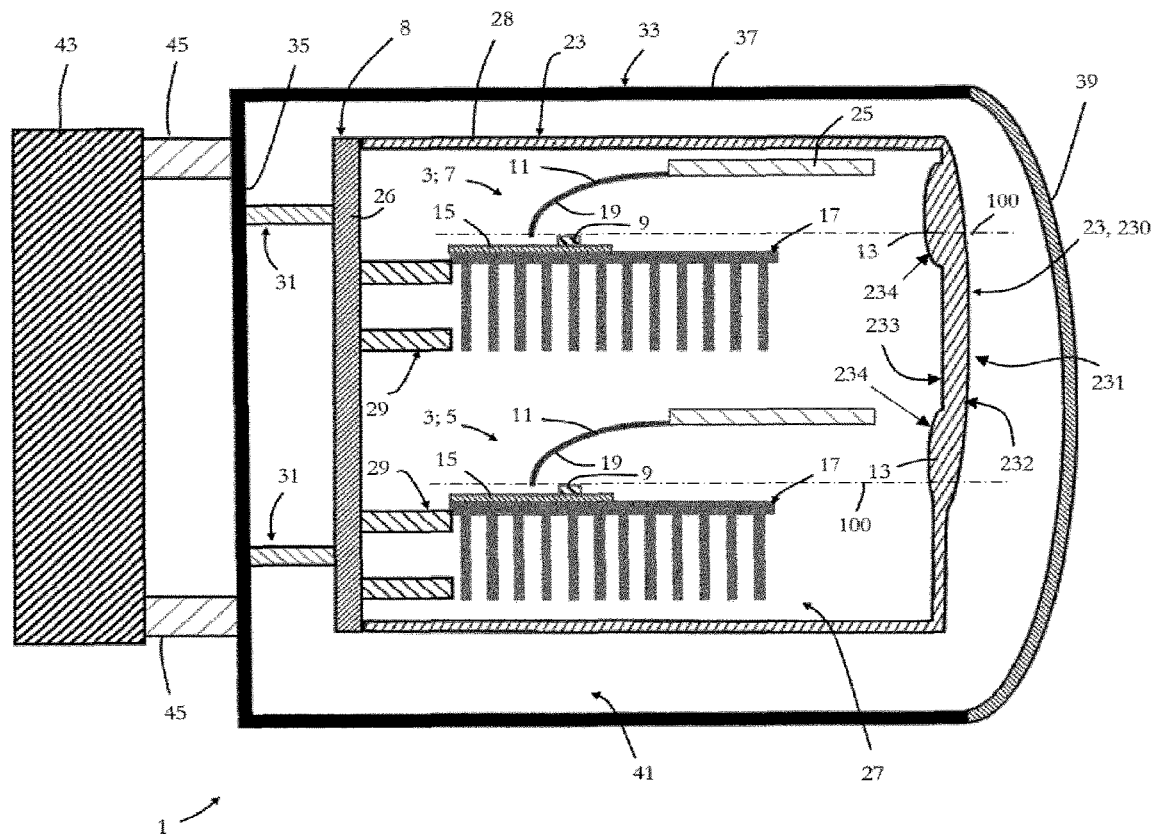
FIG. 1 is a schematic representation of a lighting device according to a first embodiment.
Figure 2:
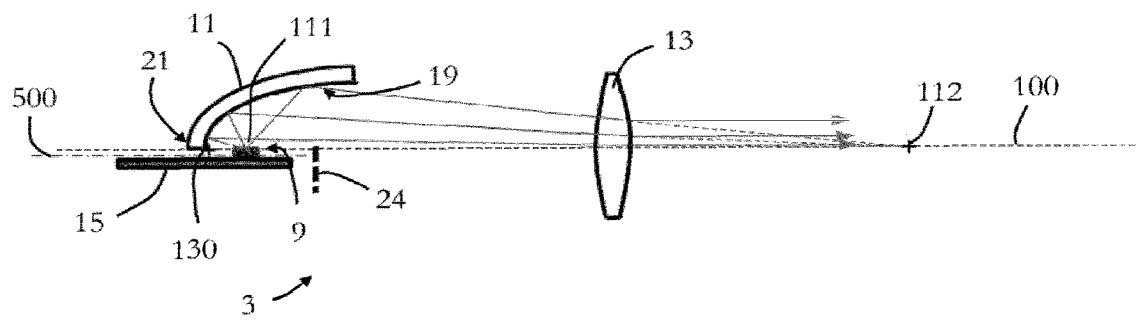
FIG. 2 is a schematic depiction of a lighting module of the lighting device of FIG. 1.

FIG. 1 is a schematic depiction of a lighting device 1 for a motor vehicle comprising two lighting modules 3, and FIG. 2 is a schematic depiction of one of said lighting modules 3 and of its principle of operation. It should be noted that, in the schematic depictions of this document, the dimensions of the components of the lighting device and the distances separating said components have been set by way of explanation and are not necessarily indicative of real life.

In the example illustrated, a first lighting module 5 and a second lighting module 7 are formed one next to the other, the modules being supported by a support member 8, for example a main mounting plate, the first lighting module 5 and the second lighting module 7 being, for example, respectively configured to project a headlamp low beam and a headlamp high beam ahead of the motor vehicle. Also, such lighting modules 3 may be positioned in such a way that the first lighting module 5 and the second lighting module 7 are not vertically and/or transversely aligned.

In the example illustrated, each lighting mode comprises at least one light source 9 able to emit rays of light, a collector 11 configured to deflect the rays of light emitted by the light source 9 along an optical axis 100 of the lighting module 3, and an optical system 13, arranged in the path of the rays of light and configured to use these rays to form a beam of light that conforms to the regulations. The first lighting module 5 and second lighting module 7 are thus configured in such a way as to respectively form a first beam of light and a second beam of light allowing a roadway setting to be illuminated in accordance with the regulations according to the conditions in which the vehicle is driving.

The light source 9 here comprises a source of semiconductor type, such as, notably, a light-emitting diode. The light source 9 is placed on a printed circuit board 15 fixed to a body 17 of the lighting module, for example forming a heatsink configured to dissipate the heat generated by the operation of the light source. The light source 9 is configured to emit rays of light in a half-space delimited by the main plane of elongation 500 of the printed circuit board, notably in the direction of the collector 11.

The collector 11 has an elliptical structure of which an internal surface is a reflective surface 19 configured to deflect the rays of light emitted by the light source 9 of the corresponding lighting module 3 in the direction of the optical system 13 along an optical axis 100 specific to each lighting module.

The collector 11 is advantageously made from materials exhibiting good heat resistance, for example of glass or of synthetic polymers such as polycarbonate (PC) or polyetherimide (PEI).

The light source 9 is particularly arranged at a first focal point of the elliptical collector 111 so that the deflected rays are directed in the direction of a second focal point 112 of the elliptical collector arranged on the optical axis 100. The optical system 13 is arranged on the optical axis between the two focal points of the elliptical collector, and more particularly takes the form of a convergent lens of which the focal point 130 is positioned here in the vicinity of a rear portion 21 of the collector 11.

The rear portion 21 of the collector 11 may comprise a horizontal cut-off with a step, not depicted. In other words, the reflective surface 19 of the collector 11, at the cut-off, may have a staircase shape. As has been specified previously, the image projected onto the roadway setting by the lighting device consists of a direct image of the collector. Thus, the beam of light generated by the rays reflected by the collector 11 and passing through the optical system 13 have a cut-off of a shape corresponding to the staircase shape of the cut-off.

The lighting module 3 may optionally comprise an opaque screen 24, depicted in dotted line in FIG. 2, interposed between the light source 9 and the optical system 13 and extending in the half-space delimited by the main plane of extension 500 of the printed circuit board and in which the reflective surface 19 of the collector 11 does not extend, so as to block the parasitic rays of light emitted by the light source 9, namely the rays heading directly towards the optical system without being deflected by the collector 11. Such a measure contributes towards limiting the presence of parasitic light rays which might participate in the formation of the light beam without however being strictly speaking imaged.

Likewise, an intermediate partition 25 may be positioned in the continuation of the free end of the collector, again in order to prevent rays of light emitted by the light source 9 from spreading out of the lighting module without passing via the appropriate optical system 13. Such an intermediate partition 25 essentially extends perpendicular to the support member 8 and advantageously absorbs light.

As described hereinabove, the first lighting module 5 and the second lighting module 7 both form parts of the one same lighting device. More particularly, in the example illustrated, the first lighting module 5 and the second lighting module 7 are borne by a base 26 of the support member 8, the first lighting module 5 and the second lighting module 7 extending in a first volume 27 essentially delimited by the support member 8 and a closure element 23 common to the two lighting modules. In particular, the closure element 23 comprises at least two side walls 28 respectively configured to be fixed to the base 26 of the support member 8, for example by snap-fastening, and a closure wall 230, arranged opposite the base 26 and positioned in such a way as to lie in the path of the exiting rays of light emitted by each light source and deflected by each collector of a lighting module.

For the purposes of simplifying and reducing the bulk of the lighting device 1 of the present invention, the optical system 13 of each lighting module consists of a thin projection lens, for example of a thickness less than 7 mm. Each optical system 13 is incorporated into the closure wall 230 of the closure element 23 common to the two lighting modules 5, 7, this closure element being borne by the support member 8.

The optical system 13 is formed on the path of the beam of light of the lighting module, the optical system 13 extending in a direction substantially perpendicular to said optical axis 100. As illustrated, the closure wall 230 comprises a central zone 231 of which the external surface 232 has a continuous convex portion facing the two lighting modules and of which the internal surface 233 has two distinct convex portions 234 one facing each of the lighting modules respectively.

The various means for adjusting the position of each of the lighting modules in the lighting device which, according to the invention, is peculiar in that these means allow adjustment through translational movement, will now be described.

The first lighting module 5 and the second lighting module 7 are each fixed to the support member 8 by first adjusting systems 29 which are configured to adjust the position of one of the lighting modules with respect to at least the other lighting module independently.

The first adjusting system 29 thus allows the position of the collector-light source assembly of the corresponding lighting module to be altered with respect to the support member 8 and to the optical system 13 of said lighting module. Each first adjusting system 29 advantageously allows the corresponding lighting module to be moved in a translational movement along an axis perpendicular to the optical axis 100, namely either in a movement in the vertical direction, or in a movement in the transverse direction.

Figure 3:
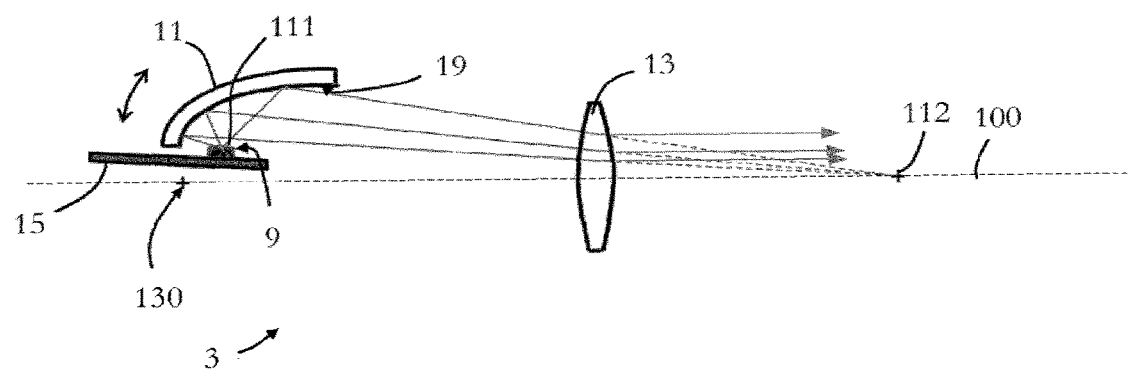
FIG. 3 is a schematic depiction of the lighting module of FIG. 2 such that it can be moved in a rotational movement according to the prior art.
Figure 4:
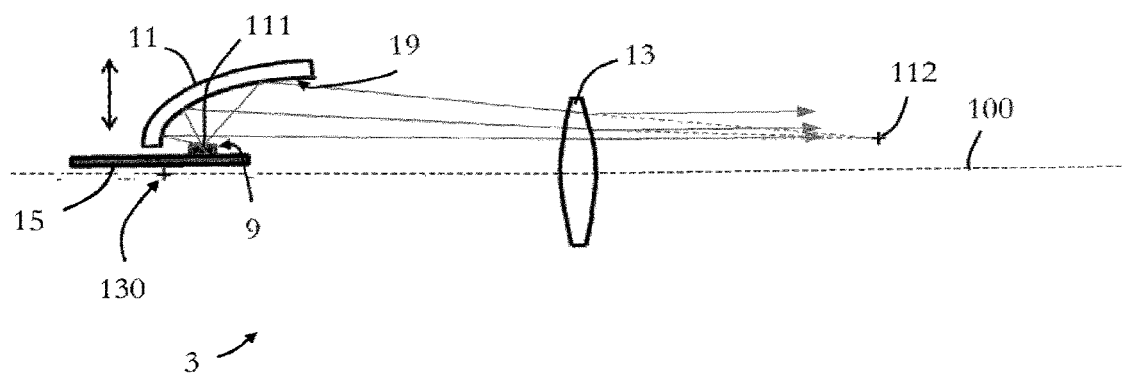
FIG. 4 is a schematic depiction of the lighting module of FIG. 2 when the lighting module is moved in accordance with the invention in a translational movement.

With reference to FIGS. 3 and 4, the inventors have found that translational adjustment is advantageously able to replace the conventionally known solutions that involve mounting the lighting module on an adjusting system that allows the lighting module to be positioned using a rotational movement. As illustrated in FIG. 3, in an already-known adjusting method, the collector-light source assembly 11, 9 is moved by pivoting about the second focal point of the collector 112. In that way, the rays emitted by the light source, which remains positioned in the vicinity of the first focal point of this collector, are always deflected in such a way as to pass through the second focal point 112 and therefore to pass through the optical system 13. Because the rays are emitted substantially in the vicinity of the focal point 130 of the optical system, for rotations of less than 5° of angle, for example, the result is that, as the rays pass through the optical system, the latter deflects these rays into a beam parallel to the optical axis on which it is centered.

The inventors have found that the position of the second focal point of the collector 112 with respect to the optical axis 100 had a negligible impact on the distribution of the beam of light passing through the optical system 13, so that the rotational movement of the collector-light source assembly 11, 9 may advantageously be approximated to a movement that is a translational movement, particularly for rotations through small angles, for example 5°. This is notably illustrated in FIG. 4 where the collector-light source assembly is mounted on an adjusting system configured to cause the collector-light source assembly to move in a translational movement perpendicular to the optical axis without any tilting of said assembly being observed. The magnitude of the translational movement is minimal and is configured so that the position of the light source is the same as for the aforementioned rotational movement. The second focal point of the collector 112 is then substantially offset with respect to the optical axis 100 in a direction parallel to the direction of the translational movement of the collector-light source assembly. The inventors have found that the combination of the effects caused by the separation between the light source and the focal point of the optical system 13o, on the one hand, and the offsetting of the second focal point with respect to the optical axis, on the other hand, generated a difference that was minimal and acceptable in terms of the regulations for the formation of the beam exiting the optical system. The use of a system for adjusting the position of the lighting module using a translational movement thus provides a simplified alternative for the lighting device 1, and it is in this context that various embodiments are described hereinafter.

The lighting device 1 as illustrated in FIG. 1 also comprises a second adjusting system 31, configured to adjust the position of the support member 8 bearing the two lighting modules 3, with respect to a fixed component, in this instance an external housing 33, thus allowing the externalization of the adjustment by rotation of the position of the lighting modules.

The lighting device 1 is thus configured to allow, first of all, independent adjustment of each lighting module with respect to the corresponding optical system 13, via the first adjusting system 29 using a translational movement and then, in a second stage, adjustment of the position of the support member 8 bearing the various lighting modules 3 with respect to the external housing 33.

The external housing 33 comprises a base 35 through which the second adjusting system 31 passes and a plurality of lateral walls 37 configured to support an optically neutral protective window 39. The external housing 33 and the protective window 39 thus delimit a main chamber 41 in which there extend the support member 8, the closure element 23, the two lighting modules and the second adjusting system 31.

In particular, the base 35 and the lateral walls 37 of the external housing 33 may be opaque so as to absorb any rays of light external to the lighting device 1.

The lighting modules 3 are thus protected from the environment external to the vehicle, particularly inclement weather or the buildup of dirt, by, on the one hand, the assembly formed by the protective window 39 and by the external housing 33 and by, on the other hand, the assembly formed by the support member 8 and the closure element 23 incorporating the optical systems 13.

In the first embodiment, the external housing 33 is attached to a structure of the motor vehicle 43 by at least one fixing member 45. The fixing member 45 extends at least between the structure of the motor vehicle 43 and the base 35 of the external housing 33 and provides a wider tolerance on the fixing of the lighting device 1 to the motor vehicle.

Figure 5:
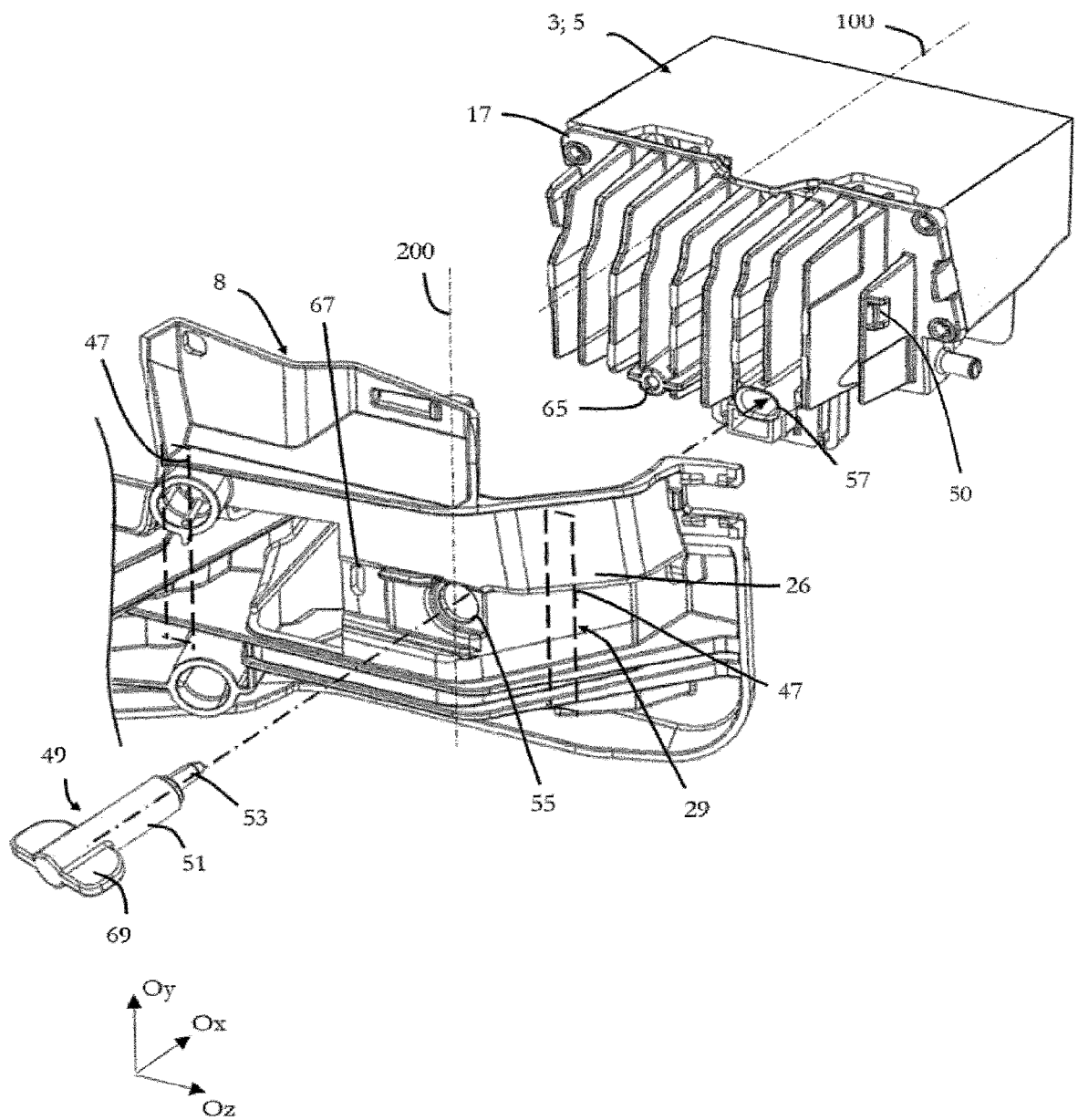
FIG. 5 is an exploded rear perspective view of a first adjusting system for adjusting the position of one of the lighting modules, allowing said module to be moved translationally.
Figure 6:
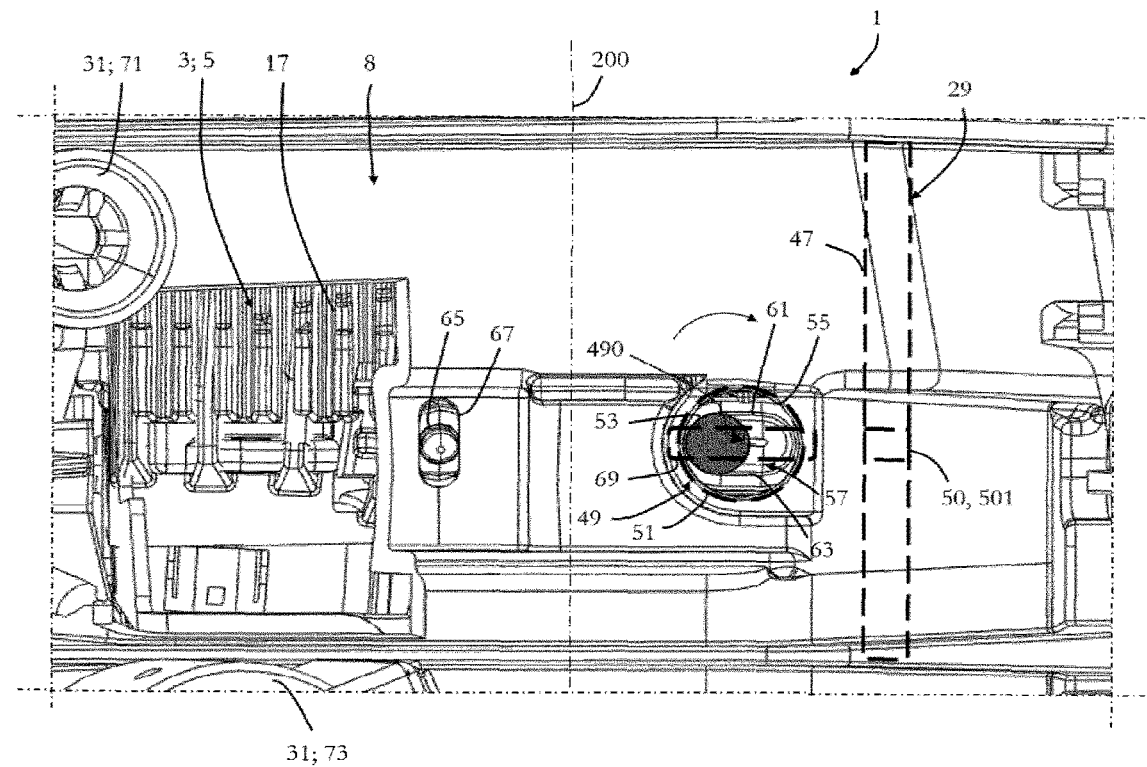
FIG. 6 is a rear view of the first adjusting system according to FIG. 5 illustrating the collaboration between an off-centered tool and the first adjusting system when the adjusting system is formed in a first position.
Figure 7:
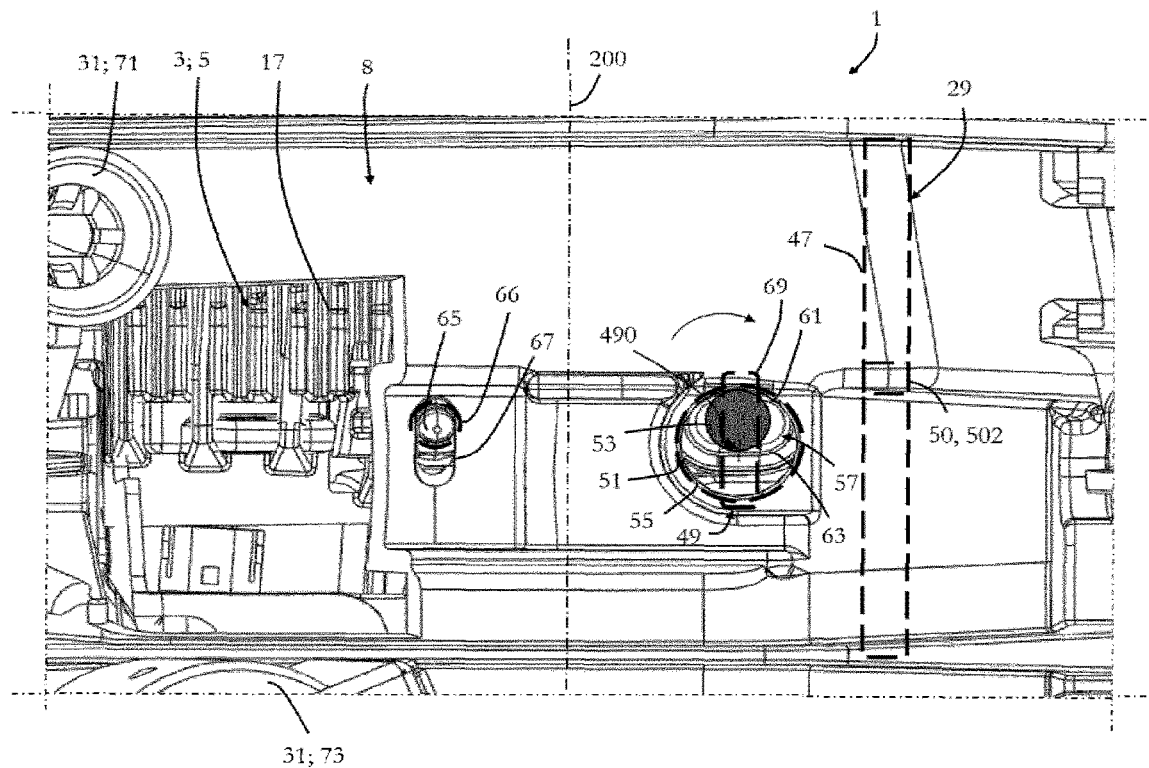
FIG. 7 is a rear view of the first adjusting system according to FIG. 6 illustrating the collaboration between the off-centered tool and the first adjusting system when the adjusting system is formed in a second position.
Figure 8:
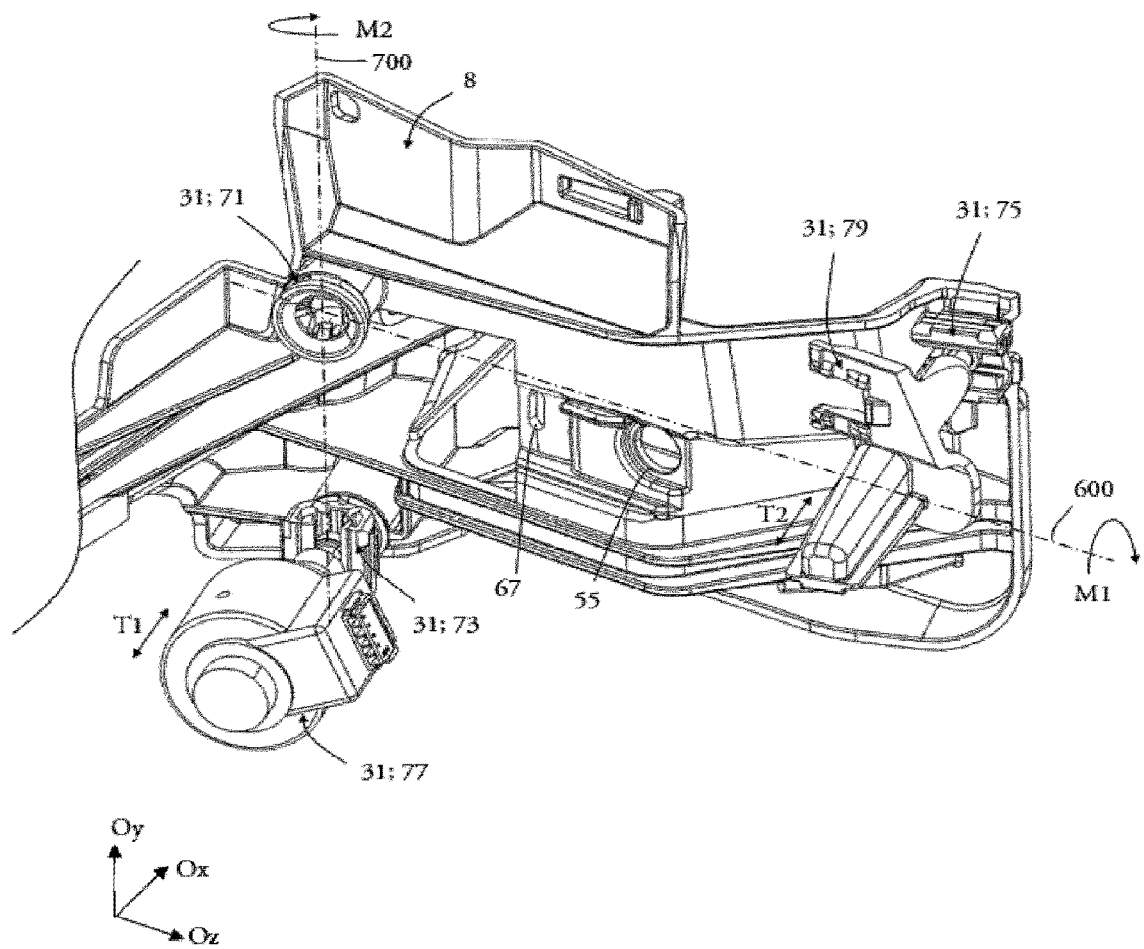
FIG. 8 is a perspective rear view of a second adjusting system for adjusting the position of the lighting modules, allowing said modules as a whole to be moved in a rotational movement, depicted in the lighting module.

FIGS. 5 to 8 illustrate the first adjusting system 29 and second adjusting system 31 as previously mentioned, FIGS. 5 to 7 detailing the first adjusting system 29 that allows the lighting module to be moved in a translational movement, while FIG. 8 details the second adjusting system 31 that allows the support member 8 bearing the first lighting module 5 and the second lighting module 7 to be moved in a rotational movement.

FIGS. 5 to 7 illustrate the first adjusting system 29 to which the first lighting module 5 is fixed. Any feature of said first adjusting system 29 may also be extended to the first adjusting system 29, not depicted, on which the second lighting module 7 is fixed.

The first adjusting system 29 is configured to cause the first lighting module 5 to move in a translational movement along an axis perpendicular to the optical axis 100. In the example illustrated, the first lighting module 5 is moved along an axis of sliding 200 substantially parallel to a vertical direction.

For this purpose, the first adjusting system 29, comprises at least translational-guidance means guiding the module with respect to the support member, and position-stop means halting the movement when the desired position for the lighting module has been obtained, as well as adjusting means for adjusting the translational movement of the lighting module.

In the example illustrated, the translational-guidance means comprise, on the one hand, a pair of guideways 47 and, on the other hand, complementary members 50 designed to slide in the guideways. And more particularly, the guideways are borne by the support member 8 and the complementary members by the lighting module, it being appreciated that, without departing from the context of the invention, these positionings could be reversed.

The guideways 47, depicted in dotted line in FIGS. 5 to 7, are fixed directly or indirectly to the base 26 of the support member 8, in this instance the main mounting plate, and face towards the front of the vehicle, namely toward the first lighting module 5. The two guideways 47 run parallel to the axis of sliding 200, in this instance to the vertical direction, and are configured to accept the complementary members of the lighting module, for example hooked tabs 50. By way of example and as illustrated, the complementary members of the first adjusting system 29 may be fixed to the body 17 of the lighting module.

The position-stop means here comprise a tapped hole 65 made in the body 17 of the lighting module and an oblong bore 67 made in the support member 8, said oblong bore extending chiefly in a direction parallel to the axis of sliding 200. The position-stop means moreover comprise a binding screw 66 which can be left permanently in the tapped hole, tightened to a greater or lesser degree, or else fitted once the desired position has been obtained. The binding screw has a shank sized to pass through the oblong bore 67 and engage with the tapped hole 65, and a head sized to bear against a wall of which the edges delimit the oblong bore (as shown in dotted line in FIG. 7 in order not to hide the tapped hole 65).

The means for adjusting position using translational movement comprise a circular orifice 55 formed in the support member 8 and an oblong cavity 57 formed in the body 17 of the lighting module, the oblong cavity running chiefly in a direction perpendicular to the axis of sliding 200. These adjusting means are operated in the way which will be described hereinbelow using an eccentric tool 49.

When the lighting module is positioned facing the support member, it should be noted that the main direction of the oblong bore 67 is perpendicular to the main direction of the oblong cavity 57. Moreover, it should be noted too that the main direction of the oblong cavity 57 is perpendicular to the main direction of the guideway that forms the adjusting means, the latter direction being parallel to the main direction of the oblong bore 67.

The eccentric tool 49 comprises a cylindrical body 51 of which the cross section has a diameter substantially equivalent to that of the circular orifice 55, and a finger 53, of which the cross section has a diameter substantially equivalent to the small dimension of the oblong cavity, the finger being off-centered with respect to the cylindrical body 51. The eccentric tool 49 may advantageously comprise wings 69 forming radial projections from the cylindrical body and aimed at making the eccentric tool 49 easier to grasp while making adjustments.

The adjustment of the position of the lighting module with respect to the support member 8 through translational movement is performed as follows.

In its pre-adjustment position, the lighting module is placed facing the support member such that the orifice 55 and the oblong bore 67 of the support member respectively face the oblong cavity 57 and the tapped hole 65 of the lighting module.

The eccentric tool 49, for example held by an arm of an automated robot, is inserted into the orifice 55 of the support member 8 until the finger 53 extends at least partially into the oblong cavity 57 of the body 17 of the lighting module, which cavity is formed facing the orifice 55 of the support member 8, as illustrated in FIGS. 5 and 6. As is more particularly visible in FIG. 6, which schematically depicts the position of the eccentric tool, with the body and wings shown in dotted line and the finger 53 shaded in gray, the oblong cavity 57 of the body 17 has two edges delimiting the cavity in the main direction of extension, these including a first edge 61 and a second edge 63 which are separated by a distance such that they are in contact with the finger 53 of the eccentric tool 49.

In order to move the lighting module in translation with respect to the support member, from a first position 501, as illustrated in FIG. 6, to a second position 502, as illustrated in FIG. 7, the eccentric tool 49 is operated in such a way that the cylindrical body 51 pivots in the orifice 55 of the support member 8 and that the finger rotates about the axis of pivoting of the cylindrical body, its rotation causing the oblong cavity to move because of the pressure of the finger 53 against the first or the second edge, depending on the direction of rotation.

In the example illustrated, the eccentric tool 49 is actuated by the wings 69 so that the cylindrical body 51 is pivoted by 90°, in the clockwise direction, in the orifice 55. Such pivoting moves the finger 53 about the axis of rotation 490 about which the cylindrical body pivots, toward a position that is offset with respect to its original position in the two directions perpendicular to this axis of rotation 490.

Because the directions of elongation of the guideways 47 and of the oblong cavity 57 are perpendicular, the adjusting system does not become jammed, and that notably means that the lighting module can accompany the rotation of the finger by sliding in the direction of elongation of the guideways 47. During this movement, the finger runs along the first edge 61 or along the second edge 63 depending on the direction of rotation of the eccentric tool, in this instance along the first edge 61. Because the lighting module is held in place by the presence of these lugs that form the complementary members to the guideways 47, its movement along the guideways is guided in a translational movement along the axis of sliding 200, perpendicular to the direction of elongation of the oblong cavity.

As illustrated in FIG. 7, the tapped hole 65 of the body 17 of the lighting module is also moved along the axis of sliding 200 and its relative position with respect to the oblong bore 67 of the support member 8 is altered correspondingly. When the lighting module is in an appropriate position, namely in a position in which the beam of light emitted corresponds to the expectations of the user, the binding screw can then be inserted, or tightened if it has remained permanently in the tapped hole, in order to hold the lighting module in this position, in this instance the second position 502.

Once the position of the lighting module has been set, the binding screw presses the lighting module against the support member to achieve at least partial fluidtightness. Sealing members may advantageously be provided on the internal face of the support member, namely on the face facing the lighting module, and on the face of the lighting module that faces the support member, around each of the oblong bore and oblong cavity, so that the clamping of the lighting module against the support member tends to compress these and provide optimal sealing.

Thus, it should be noted that it is possible to have means for translationally adjusting the position of the lighting module from outside the first volume defined by the support member 8 and the closure element 23, thereby facilitating said adjustment while at the same time maintaining optimal sealing.

In the lighting device according to the invention, the lighting modules are adjustable in translational movement inside this first volume defined by the support member 8 and the closure element 23, and this assembly is adjustable in position via a more conventional second adjusting system 31. As previously explained, in the first embodiment the second adjusting system 31 allows the support member 8 bearing the two lighting modules to be fixed to the base 35 of the external housing 33. The second adjusting system 31 is configured to allow the support member 8 to be moved in a multiaxial rotational movement, in this instance with respect to the external housing 33.

To do this, the second adjusting system 31 comprises a fixed point 71, depicted in FIG. 8 without the complementary part for fixing to the external housing, a first articulation 73 and a second articulation 75 with associated actuators.

The first articulation 73 is configured to accept a first actuator 77 equipped with a deploying rod of which the free end collaborates with said first articulation 73 via a sliding connection oriented in a first direction. The movement of the first actuator 77, in sliding in a translational movement T1 in both directions, causes the rod and therefore the support member 8 and therefore the lighting modules 3 to move in a rotational movement M1 about a first axis of pivoting 600 formed by the fixed point 71 and the second articulation 75, in this instance an axis substantially parallel to the transverse direction. In the chosen orientation of FIG. 8, actuation of the first actuator 77 thus allows adjustment of the vertical orientation of the support member 8 and of the two lighting modules 3.

Similarly, the second articulation 75 is configured to accept a second actuator 79 equipped with a deploying rod of which the free end collaborates with said second articulation 75 via a sliding connection oriented in a second direction perpendicular to the first direction. The movement of the second actuator 79, in sliding in a translational movement T2 in both directions, causes the rod and therefore the support member 8 and therefore the lighting modules 3 to move in a rotational movement M2 about a second axis of pivoting 700, formed by the fixed point 71 and the first articulation 73, in this instance an axis substantially parallel to the vertical direction and substantially perpendicular to the first axis of pivoting 600. In the chosen orientation of FIG. 8, actuation of the first actuator 77 thus allows adjustment of the horizontal orientation of the support member 8 and of the two lighting modules 3.

Figure 9:
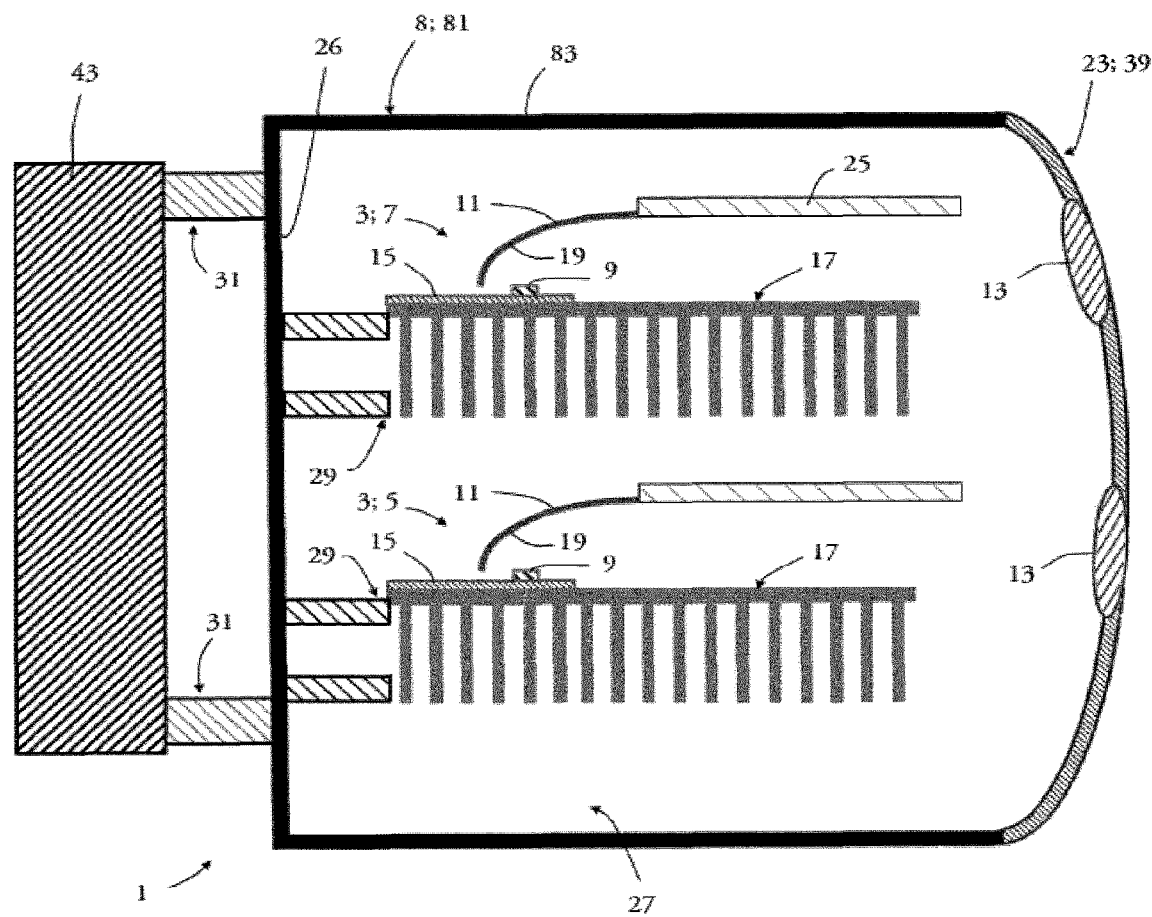
FIG. 9 is a schematic representation of a lighting device according to a second embodiment.
Figure 10:
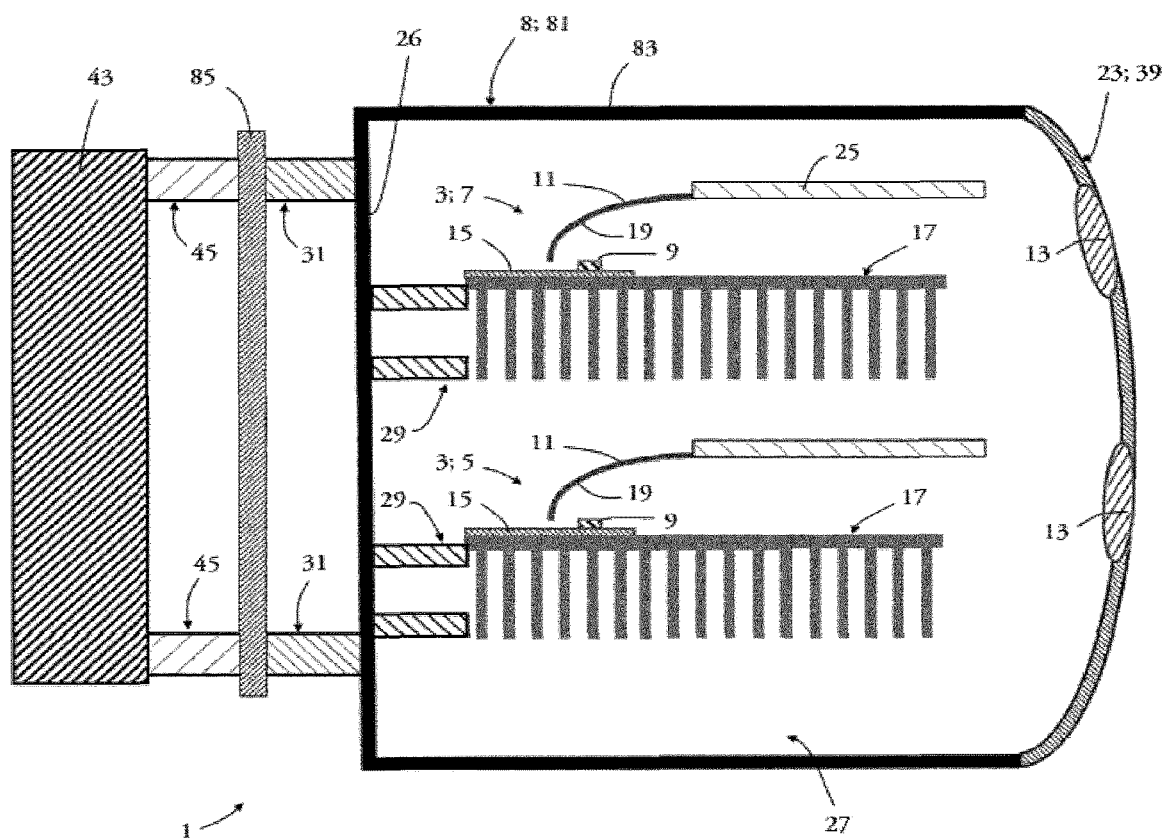
FIG. 10 is a schematic representation of a lighting device according to one alternative of the second embodiment.

FIGS. 9 and 10 respectively illustrate a second embodiment and an alternative of the second embodiment of the lighting device 1 employing the first adjusting system 29 and the second adjusting system 31 as explained hereinabove.

These embodiments differ from the first embodiment in that the support member 8 is a protective housing 81 that is open on at least one side. The protective housing 81 comprises the base 26 and a plurality of opaque side walls 83, the protective housing 81 being configured in particular to support the closure element 23.

The closure element 23 is fixed to the side walls 83 in such a way as to close the protective housing 81 and to delimit the first volume 27. The assembly formed by the support member 8 and the closure element 23 thus, as explained previously in the first embodiment, delimits a space in which the first lighting module 5 and the second lighting module 7 extend.

In addition, these embodiments differ from the first embodiment in that the closure element 23 is a neutral protective window 39, configured to incorporate or bear the optical systems 13 corresponding to each lighting module, consisting of thin projection lenses. The protective window 39 may thus be made from the same material as that of the optical systems 13 or else may be made of a material distinct from that used for producing the optical systems, said material not encouraging the projection of the light beam. The closure element 23 thus forms a protective physical barrier between the lighting modules and the environment external to the vehicle. The protective window and/or the optical systems 13 incorporated into the protective window may be made of polymethyl methacrylate (PMMA) or of polycarbonate (PC).

Similarly to the first embodiment, each of the bodies 17 of the lighting modules is fixed to the base 26 of the support member 8 by the first adjusting system 29, which allows the collector-light source assembly 11, 9 to be positioned, by a translational movement perpendicular to the optical axis 100, with respect to the corresponding optical system 13.

In the second embodiment, which is depicted in FIG. 9, the second adjusting system 31 as described previously extends between the base 26 of the support member 8 and the structure of the motor vehicle 43. The second adjusting system 31 is thus configured to adjust the position of the support member 8 with respect to the structure of the motor vehicle 43 by moving with a rotational movement, notably about the first axis of pivoting 600 or about the second axis of pivoting 700 as depicted in FIG. 8.

In the alternative of the second embodiment, which is depicted in FIG. 10, the second adjusting system 31 extends between the base 26 of the support member 8 and an intermediate mounting plate 85, which is fixed to the structure of the motor vehicle 43 via at least one fixing member 45. The presence of such an intermediate mounting plate 85 notably gives a wider tolerance on the fixing of the lighting device 1 to the motor vehicle, thereby simplifying the mounting of said device.

It will have been understood from reading the foregoing that the present invention proposes a motor vehicle lighting device that is simplified and more compact, comprising at least two lighting modules comprising an optical system of the thin projection lens type, the lighting device also comprising a first adjusting system and a second adjusting system for adjusting the position of said lighting modules. The first adjusting system is configured to adjust the position of at least one of the lighting modules independently of at least the other lighting module by means of a translational movement with respect to the corresponding optical system, while the second adjusting system allows the simultaneous movement of the various lighting modules in a rotational movement. Also, the lighting device comprises a common element, bearing at least two optical systems and configured to at least partially protect the lighting modules.

The invention is not however limited to the means and configurations described and illustrated here, and it also encompasses any equivalent means or equivalent configuration and any workable technical combination of such means. In particular, the number of lighting modules may be modified without having a negative effect on the invention, provided that the lighting device ultimately fulfills the same functionalities as those described in this document.

The invention claimed is:

1. A lighting device, notably for a motor vehicle, comprising at least two lighting modules and at least one support member supporting said lighting modules, each lighting module comprising at least one light source able to emit rays of light and an optical system positioned, on an optical axis specific to the lighting module, across the rays of light and configured to project a beam of light, wherein the support member supporting the various lighting modules is, on the one hand, secured to a closure element incorporating at least two optical systems and, on the other hand, connected to at least a first adjusting system allowing one of the lighting modules to be moved independently with respect to at least the other lighting module.

2. The lighting device as claimed in claim 1, wherein each lighting module is mounted on the support member via a first adjusting system comprising translational-guidance means guiding the lighting module with respect to the support member, the lighting device being configured so that the translational-guidance means are oriented in different directions.

3. The lighting device as claimed in claim 1, wherein each first adjusting system comprises, in addition to the translational-guidance means guiding the lighting module with respect to the support member, on the one hand, position-stop means and adjusting means for adjusting the translational movement of the lighting module.

4. The lighting device as claimed in claim 3, wherein the position-stop means and the adjusting means comprise at least one oblong element and a circular element which are formed respectively on one or the other of the lighting module and the support member and positioned facing one another, the oblong element of the position-stop means extending in a direction substantially perpendicular to the direction in which the oblong element of the adjusting means extends.

5. The lighting device as claimed in claim 3, wherein the first adjusting system(s) are configured so that the translational-guidance means are inside a first volume defined by the support member and the closure element, and so that the position-stop means and the adjusting means respectively comprise a binding screw or a tool passing through a base of the support member.

6. The lighting device as claimed in claim 1, wherein the position of the support member is adjusted by a second adjusting system, said second adjusting system being configured to simultaneously adjust the position of the various lighting modules.

7. The lighting device as claimed in claim 6, wherein the second adjusting system is configured to move the support member in a rotational movement about a first axis of pivoting or about a second axis of pivoting, the first axis of pivoting and the second axis of pivoting being substantially perpendicular to the optical axis and substantially perpendicular to one another.

8. The lighting device as claimed in claim 1, wherein the closure element comprises side walls for fixing to the support member and a thin projection lens which incorporates at least the optical systems of said lighting modules, the thin projection lens formed in the closure element and the optical systems being made from the one same material.

9. The lighting device as claimed in claim 8, comprising an external housing open on at least one side and closed by an optically neutral protective window, the external housing and the protective window delimiting a main chamber in which there extend the support member, the various lighting modules and at least the closure element incorporating the optical systems of at least two lighting modules.

10. The lighting device as claimed in claim 1, wherein the support member takes the form of an open housing equipped with opaque side walls and covered by a protective window, the protective window being made of a transparent and optically neutral first material, and the protective window comprising at least the optical systems of at least two distinct lighting modules, the optical systems consisting of thin projection lenses made from a second material distinct from the first material of the protective window.

11. The lighting device as claimed in claim 1, wherein each lighting module comprises a collector in the direction of which the light source emits its rays, said collector being equipped with a reflective surface configured to deflect the rays of light emitted by the light source in the direction of the optical system.

12. The lighting device as claimed in claim 11, wherein the optical system is configured to project an image of the reflective surface of the collector.

13. The lighting device as claimed in claim 12, wherein the collector has an end edge in the vicinity of the light source with a specific profile which contributes to giving the projected image an appropriate profile, and notably an appropriate cut-off, for performing a desired optical function.

14. The lighting device as claimed in claim 13, wherein the end edge of the collector is cut off in such a way as to exhibit a staircase profile.

15. The lighting device as claimed in claim 11, wherein the collector has an elliptical or parabolic shape.

16. A motor vehicle comprising at least one lighting device as claimed in claim 1, formed on the front face and/or on the rear face of the motor vehicle.

17. The lighting device as claimed in claim 2, wherein each first adjusting system comprises, in addition to the translational-guidance means guiding the lighting module with respect to the support member, on the one hand, position-stop means and adjusting means for adjusting the translational movement of the lighting module.

18. The lighting device as claimed in claim 4, wherein the first adjusting system(s) are configured so that the translational-guidance means are inside a first volume defined by the support member and the closure element, and so that the position-stop means and the adjusting means respectively comprise a binding screw or a tool passing through a base of the support member.

19. The lighting device as claimed in claim 2, wherein the position of the support member is adjusted by a second adjusting system, said second adjusting system being configured to simultaneously adjust the position of the various lighting modules.

* * * * *